Nov. 11, 1924.
H. OSSWALD
CAP MAKING MACHINE
Filed Oct. 21, 1920
1,515,404
2 Sheets-Sheet 1
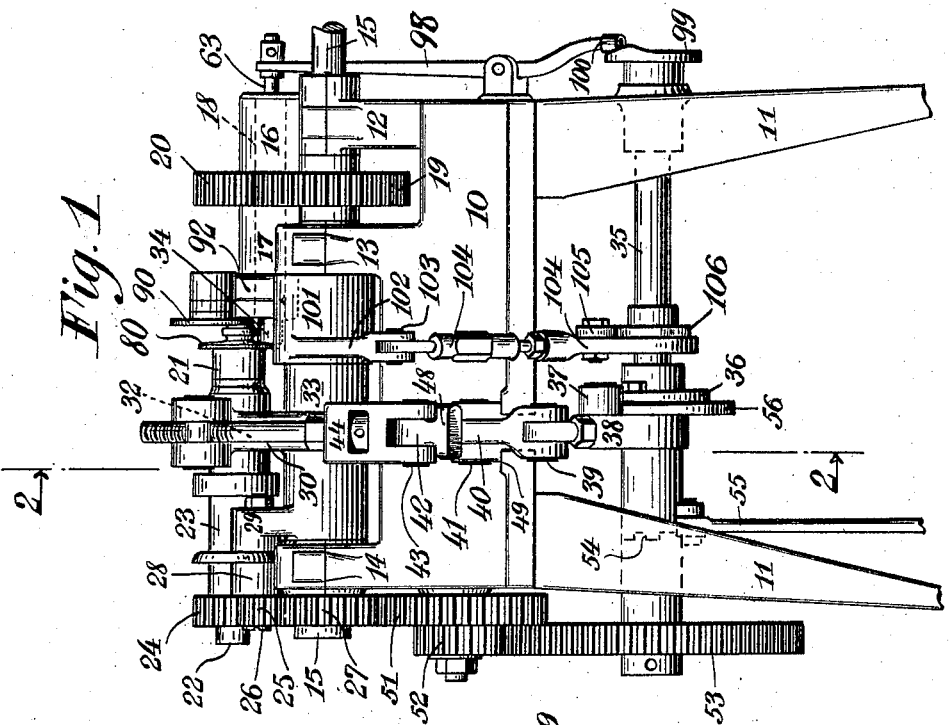
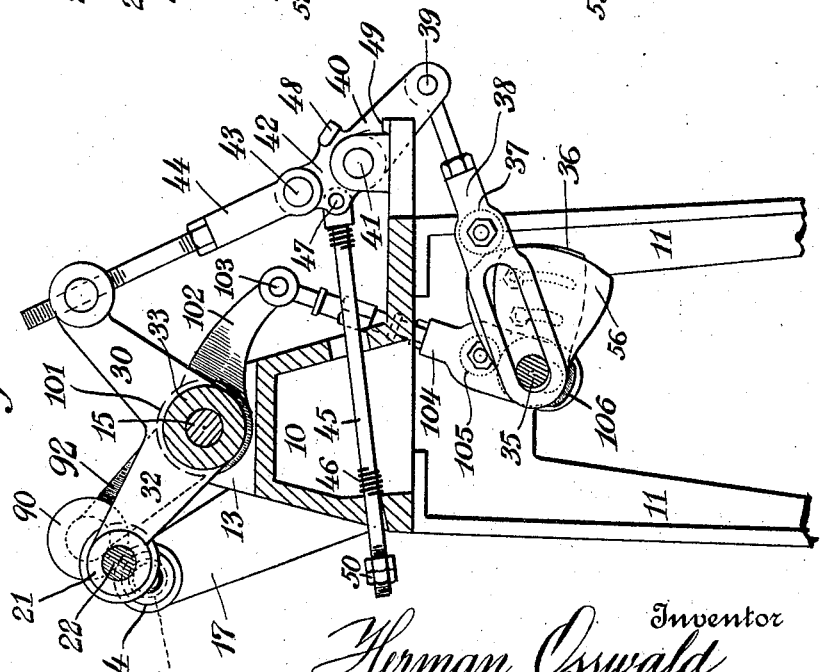
Inventor
Herman Osswald
By his Attorney
Ivan E. A. Konigsberg

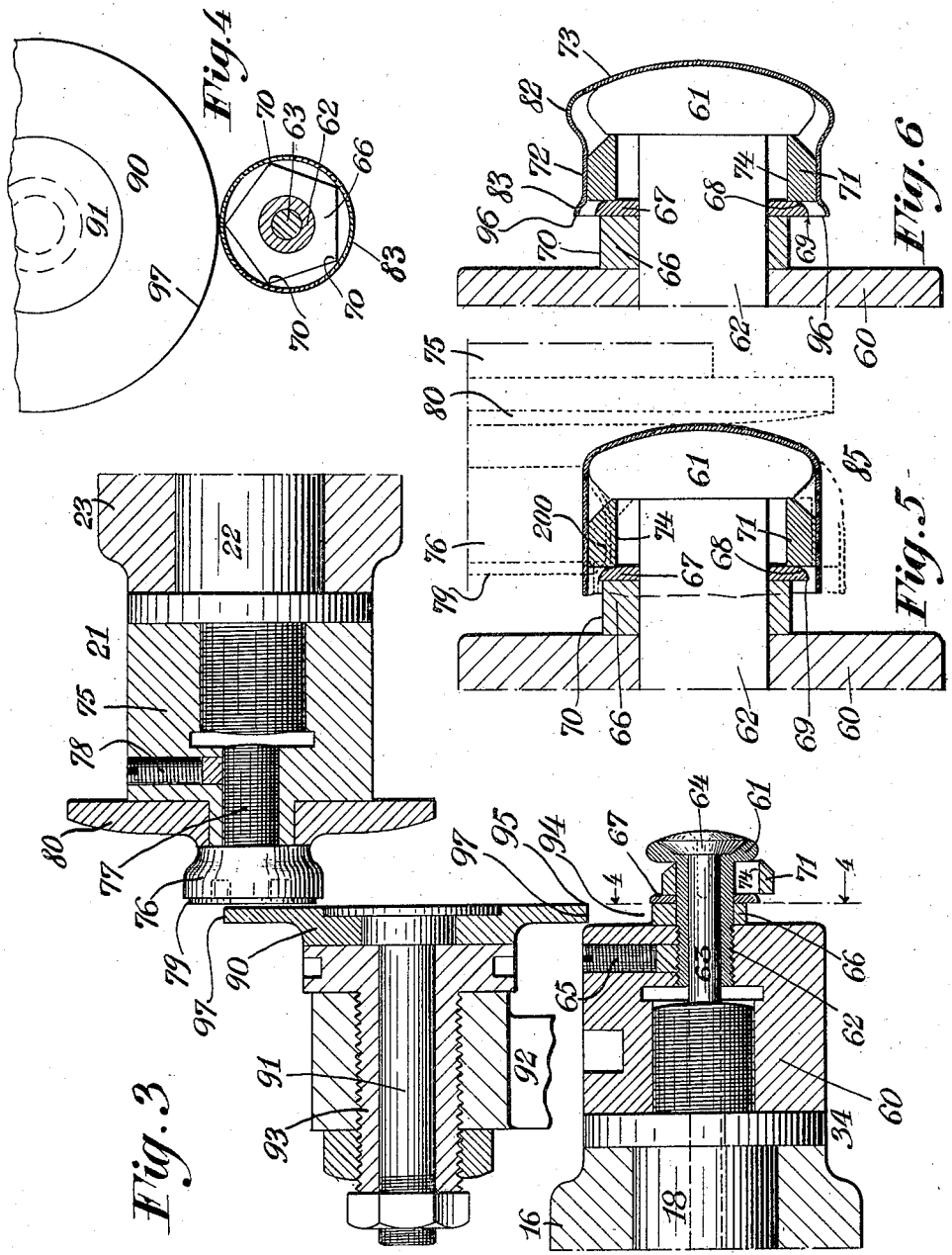

Patented Nov. 11, 1924.

1,515,404

UNITED STATES PATENT OFFICE.

HERMAN OSSWALD, OF RICHMOND HILL, NEW YORK.

CAP-MAKING MACHINE.

Application filed October 21, 1920. Serial No. 418,349.

*To all whom it may concern:*

Be it known that I, HERMAN OSSWALD, a citizen of the United States, and resident of Richmond Hill, in the county of Queens and State of New York, have invented certain new and useful Improvements in Cap-Making Machines, of which the following is a specification.

This invention relates to improvements in cap making machines and has particular reference to an improved machine for making caps of the type adapted for use on glass bottles or jars and where it is required that the cap shall be provided with a constricted or narrowed neck portion having an enlarged head or closed end, while the open end of the cap is provided with a bead or flange of greater diameter than the said neck or main portion of the cap.

One object of the invention is to provide a simple, novel and improved machine for making caps of the type described. Another object is to provide novel means for trimming the cap. Other objects will appear as this specification proceeds. Accordingly my invention is embodied in a cap making machine arranged, designed and constructed as hereinafter set forth while reference is had to the accompanying drawings in which—

Fig. 1 is a side elevation of a cap making machine embodying my invention with parts omitted and parts broken away.

Fig. 2 is a sectional view of the machine taken on line 2—2 of Figure 1.

Fig. 3 is an enlarged sectional view of the chucks and trimming or cutting elements.

Fig. 4 is a sectional view of the scrap cutting element taken on line 4—4 of Figure 3.

Fig. 5 is a fragmentary sectional view illustrating the operation for forming a cap.

Fig. 6 illustrates the finished cap prior to the ejectment thereof from the chuck.

Referring to the drawings the several parts of the machine are mounted upon a suitable frame 10 which rests on legs 11, 11. The frame forms three aligned bearings 12, 13 and 14 in which the main driving shaft 15 is journaled. The frame also forms two off set aligned bearings 16 and 17 in which the fixed chuck shaft 18 is journaled. Any suitable means, not shown, may be employed to drive the main shaft 15, which drives the chuck shaft 18 by means of two intermeshing gears 19 and 20.

The cap is formed between two co-operating chucks, one of which is preferably stationary and receives the cap blank, while the other chuck is movable and is adapted to be brought into contact with the fixed chuck to form the cap. The terms fixed and removable chucks employed herein and in the claims are used to describe the relative relationship between the chucks irrespective of the fact that they are both rotatable as is well understood in the art.

The movable chuck 21 is mounted to rotate on a chuck shaft 22 journaled in the bearing 23. The shaft 22 carries a gear 24 which meshes with an idler gear 25 on a stud shaft 26 which in turn is driven from the main shaft 15 by a gear 27. The bearing 23 for the chuck shaft 22 and the bearing 28 for the stud shaft 26 are both parts of a rocker arm which comprises branches 29 and 30 extending to the one side of the shaft 15, and a third branch 32 extending to the other side of the shaft 15 and in line with the branch 30 aforesaid. The said arms or branches are part of the rocker arm sleeve 33 which is preferably journaled on trunnions (not shown) instead of being pivoted or journaled directly on the main shaft 15 so as to relieve the latter from the operating pressure on the rocker arm as will appear hereinafter. The main shaft 15 extends through the rocker arm sleeve 33.

In order to bring the movable chuck 21 into operative relationship with the fixed chuck 34, the rocker arm is operated by a toggle mechanism to insure smooth even work at steady pressure. To this end there is provided a cam shaft 35 carrying a rocker cam 36 upon which runs a cam roll 37 carried by the slotted cam rod 38. The latter is pivoted at 39 to a two armed lever 40 pivoted intermediate its ends at 41 to the frame 10. The portion 42 of the lever 40 forms a toggle link pivoted at 43 to the other, adjustable, toggle link 44. 45 is a guiding rod provided with a spring 46 which tends to break the toggle and which keeps the cam roll 37 on the cam 36. The rod 45 is pivoted to the toggle at 47. 48 is a stop on the toggle adapted to come to rest upon the pads 49 on the frame. The rod 45 is also provided with nuts 50 which may be adjusted to limit the sliding movement of the rod so as to provide for a degree of movement of the lever 40 outside the degree of movement thereof permitted or regulated by the cam 36.

The cam shaft 35 is driven from the main shaft 15 by gears 27, 51, 52 and 53. 54 is a clutch to couple the shaft 35 to the gear 53 as will be understood. The clutch is operated by a treadle 55.

It will be understood from the foregoing that when the treadle is depressed, while the machine is running, the movable chuck 21 is moved down into co-operative relationship with the fixed chuck 34 through the instrumentalities of the cam 36, cam rod 38, toggle 42—43 and the rocker arm 30—32 and that the chuck 21 remains down in contact with the chuck 34 so long as the cam roll 37 runs on the high part of the cam 36. The effective high part of the latter may be adjusted by an auxiliary cam as shown at 56.

Referring now to Figures 3 to 6 it will be seen that the fixed chuck 34 comprises a chuck head 60 which is screwed fast on the chuck shaft 18. A cap-head forming die 61 is screwed into the chuck head 60 by means of a threaded stem 62. The latter is hollow and through it and the shaft 18 passes the knock out rod 63 which carries the knock out 64. The latter is seated in the cap head forming die and forms a part thereof, as shown. A set screw 65 may be used to secure the forming die 61 in the chuck head 60. The stem 62 carries a scrap cutter 66 and a beading and trimming washer 67 provided with a beading edge 68 and a trimming edge 69, see Figure 5. The scrap cutter 66 is provided with longitudinal cutting edges 70, see Figure 4. Between the beading and trimming washer 67 and the die 61, the stem 62 carries a floating ring 71 or inner cap neck supporting die member, the function of which will be explained later. The member 71 is of an outside diameter to fit within the neck 72 of the finished cap 73, see Figure 6, the diameter of the said neck 72 being equal to the diameter of the cap blank used for making the cap, and the inside ring diameter at 74 is large enough to permit said ring to be shifted transversely of the stem 62 so as to form a support for the neck 72 of the cap between the washer 67 and the die head 61 during the formation of the cap as shown in dotted lines in Figure 5 at 200.

The outside diameter of the ring 71 is of course slightly larger than the diameter of the head 68, sufficient to permit removal of the finished cap.

The movable chuck 21 comprises a chuck head 75 screwed fast upon the chuck shaft 22, see Figure 3. A cap head forming roller 76 has a shank 77 screwed into the head 75 and secured by a set screw 78. The roller 76 has an annular beading shoulder 79 adapted to cooperate with the beading edge 68 on the washer 67. A cap holding flange 80 is clamped to the chuck 21 by the forming roller 76. The latter and the said flange 80 constitute an outer cap forming die member as distinguished from the inner die members 61, 67 and 71.

The construction and the positions of the different parts of the two chucks 34 and 21 are shown in Figure 3 which illustrates the chucks in inactive position.

The finished cap 73 is shown in Figure 6 just prior to its ejection from the fixed chuck 34. It will be seen that the cap 73 comprises a constricted neck 72 intermediate an enlarged cap head 82 and a bead 83 of larger diameter than the neck 72.

The operation in forming the cap is as follows: A cap blank 85 of a diameter substantially equal to the diameter of the neck 72 is placed upon the die head 61 as shown in full lines in Figure 5. The placing of the cap on the fixed chuck may be done by hand feeding or automatic feeding means of the character shown in my U. S. Patent Number 1,391,492, September 20, 1921, may be used.

As shown in Figure 5 when the cap is placed upon the chuck it automatically positions the floating ring 71 concentric with the die head 61 and inasmuch as the floating ring fits within the neck portion 72 of the finished cap, it follows that the said neck portion is at all times supported on said floating ring and crumbling, buckling, crimping or tearing of the cap blank between the head 82 and the bead 83 is prevented.

After the blank has been placed in position, the treadle is depressed and the outer die is brought into cooperative relationship with the fixed die as shown in Figure 5. It will be seen that as the movable die is pressed against the cap blank, the forming roller 76 depresses that portion of the blank which forms the neck 72 of the finished cap, which is at the point of contact between the two dies, and shifts the floating ring transversely of the stem 62 causing the corresponding diametrically opposite portion of the blank to bulge out as seen in dotted lines at the bottom of Figure 5. As further seen from the dotted lines at 200, the metal of the blank is at the same time drawn out over or spun out over the washer 67 and the head 61. As now the two dies rotate in contact with each other, the blank is being spun around and the metal thereof is spun over the washer and the head to form the bead 83 and the cap head 82. During this operation the floating ring is whirled around the stem and is by the centrifugal force gradually moved or lifted, as it were, into concentric position as shown in Figure 6, at which time the bead 83 and the head 82 of the cap have been completely formed by the metal being spun around and drawn over the washer 67 and head 61. In other words, the floating ring supports the blank at its smallest fixed diameter while the head of the cap and the bead is formed by enlarging the blank. So that while at the beginning of the forming operation, the floating ring is eccentrically positioned on the die stem 63 by the pressure exercised by the forming roller 76, it is gradually lifted into concentric position as shown in Figure 6 where the cap is finished. The positioning of the blank and the floating ring is shown in full lines in Figure 5. The first deformation of the blank caused by the impact of the forming roller 76 is shown in dotted lines at 200 in said figure. From the last named position and until the completion of the cap as in Figure 6, the floating ring is gradually lifted into concentric position on the stem 62, the metal blank being gradually enlarged around the head 61 and washer 67. The function of the floating ring is to support the neck portion of the blank throughout the entire operation and to preserve the minimum diameter, the diameter of the neck of the cap, not only as a matter of size per se, but to permit removal of the finished cap. About three to four revolutions of the two chucks suffice to complete the forming of the cap.

During the last one or two revolutions of the chucks, the cap is trimmed by the trimming roll 90, which is rotatably mounted on a stud 91 adjustably carried in an arm 92 by means of an adjusting sleeve 93.

When the cap has been formed the trimming roll descends automatically into the space 94 between the trimming edge 69 and the chuck head 60 and by cooperation between the cutting edge 95 of the roll and the said trimming edge 69 the cap is cut or trimmed circumferentially to a finished edge 96, see Figure 6. And by cooperation between the side 97 of the roll and the cutting edges 70 of the scrap cutter, the cut off portion or scrap of the blank is cut into pieces and thrown off the chuck as it rotates. The movable chuck stays down on the fixed chuck while the blank is trimmed and the scrap cut off. Thereafter the trimming roll moves up and the movable chuck leaves the fixed chuck.

The finished cap is pushed off the fixed chuck by the knock out which is operated by a lever 98 actuated by a cam roll 100 and cam 99, see Figure 1 in the usual manner.

The trimming roll arm 92 extends upwardly from a sleeve 101, rotatably carried on a reduced portion of the rocker arm sleeve 33 aforesaid, see Figure 1, from the said sleeve 101 extends downwardly an arm 102 which is pivoted at 103 to a link 104 which carries a cam roll 105. The latter runs on a cam 106 fast on the cam shaft 35. The cam 106 is of course so timed that the cap is trimmed quickly after it has been formed and the trimming roll quickly lifted after the trimming and scrap-cutting operation.

The aforesaid parts are very efficient in their operation, simple to make and assemble and not apt to get out of order. The floating ring 71 is a distinguishing feature of the construction and certain and automatic in its operation.

While I have disclosed my invention in its preferred form, it will be understood that I do not wish to be limited to the exact construction shown, but that changes and alterations of the several parts and arrangements thereof may be made without departing from the spirit of my invention or the scope of the appended claims.

I claim:

1. The combination of an inner die adapted to support the blank to be acted on from within the same, an outer die, means for moving the latter into operative relationship with the said inner die to act on the blank and means rotatably carried by said inner die for supporting a portion of the blank during the operations thereon.

2. The combination of an inner die adapted to support the blank to be acted on from within the same, an outer die, means for moving the latter into operative relationship with the said inner die to act on the said blank and means rotatably mounted upon said inner die and disconnected therefrom for supporting a portion of the blank during the operations thereon.

3. The combination of an inner die adapted to support a blank from within the same, an outer die, means for moving the latter into operative relationship with the said inner die to act on the blank, and a member rotatably mounted on said inner die and adapted to rotate in eccentric relationship to said inner die for supporting a portion of the blank while the same is being operated upon by the said dies.

4. The combination of an inner die adapted to support a blank from within the same, an outer die, means for moving the latter into operative relationship with said inner die to act on the blank and an annular member loosely supported on said inner die and disconnected from the same for supporting a portion of the blank while the same is being operated upon by the said die.

5. The combination of a die comprising a die head for enlarging a portion of a blank at the one end thereof, a washer for forming a bead at the other end of the blank, a member intermediate the said die head and washer for supporting the blank between the said enlarged portion and the said bead, said member being rotatably mounted adjacent said die head and disconnected from the same, a second die adapted to be moved with operative relationship with said first named die to form the said blank and means for operating the said two dies.

6. The combination of an inner die adapted to support a blank form within the same, said inner die comprising a plurality of blank forming elements, one of which is disconnected from the others, a scrap cutter mounted adjacent said die, an outer die adapted to cooperate with the said inner die to form the said blank, means for operating the said dies and cutting means adapted to cooperate with the said scrap cutter to cut the scrap from the formed blanks.

7. The combination of an inner die for forming a blank with enlarged portions at the opposite ends thereof, an outer die adapted to co-operate with the said inner die, a member carried by the latter for supporting the portion of the blank intermediate its ends, a cutting member having a plurality of cutting edges mounted adjacent said inner die, means for operating the said dies, a cutting element adapted to co-operate with the said cutting member for cutting the scrap of the blank to cause said scrap to be automatically removed from the same.

8. The combination of a die comprising a die head and a beading washer supported in longitudinal fixed alinement, spaced a distance apart and adapted to support a blank, a second die adapted to co-operate with said first named die for forming said blank with an enlarged head and an enlarged bead, means for operating the said two dies and a member loosely carried by said first named die between the said die head and washer, said member being adapted to move transversely with respect to said die head and washer in accordance with the configuration of the said second die to support the said blank intermediate its enlarged portions during the formation thereof.

9. The combination of a die comprising a die head and a beading washer supported in longitudinal fixed alinement, spaced a distance apart and adapted to support a blank, a second die adapted to co-operate with said first named die for forming said blank with an enlarged head and an enlarged bead, means for operating the said two dies, and a blank supporting ring loosely carried by said first named die between the said die head and washer, said blank supporting ring being adapted to move transversely with respect to said die head and washers in accordance with the configuration of the said second die to support the said blank intermediate its enlarged portions during the formation thereof.

10. The combination of a die comprising a die head and a beading washer supported in longitudinal fixed alinement, spaced a distance apart and adapted to support a blank, a second die adapted to co-operate with said first named die for forming said blank with an enlarged head and an enlarged bead, means for operating the said two dies, and a member loosely carried by said first named die between the said die head and washer, said member being adapted to move transversely with respect to said die head and washers in accordance with the configuration of the said blank intermediate its enlarged portions during the formation thereof and means co-operating with the said beading washers for trimming the blank after it has been formed.

11. The combination of a die comprising a die head and a beading washer supported in longitudinal fixed alinement, spaced a distance apart and adapted to support a blank, a second die adapted to co-operate with said first named die for forming said blank with an enlarged head and an enlarged bead, means for operating the said two dies, a member loosely carried by said first named die between the said die heads and washer, said member being adapted to move transversely with respect to said die head and washer in accordance with the configuration of the said second die to support the said blank intermediate its enlarged portions during the formation thereof, means for trimming the blank after it has been formed and means for cutting the trimmed off scrap to remove the same.

12. The combination of a die comprising a die head and a beading washer for enlarging predetermined portions of a blank, a second die adapted to co-operate with said first named die to form the said blank, a floating ring mounted on said first named die for supporting the blank during the formation thereof at the portions where said blank has a predetermined minimum diameter and means for operating the said dies.

13. The combination of a die comprising a die head and a beading washer for enlarging predetermined portions of a blank, a second die adapted to co-operate with said first named die to form the said blanks, a floating ring mounted on said first-named die for supporting the blank during the formation thereof at the portions where said blank has a predetermined minimum diameter, means for operating the said dies and means for trimming the blank after it has been formed.

14. The combination of a die, comprising a die head and a beading washer for enlarging predetermined portions of a blank, a screw die adapted to co-operate with said first named die to form the said blank, a floating ring mounted on said first named die for supporting the blank during the formation thereof at the portions where said blank has a predetermined minimum diameter, means for operating the said dies and for cutting the trimmed off portions of the blank into separate pieces to remove the same.

HERMAN OSSWALD.